United States Patent
Urushihata

(10) Patent No.: US 8,413,624 B2
(45) Date of Patent: Apr. 9, 2013

(54) VALVE TIMING CONTROL APPARATUS

(75) Inventor: Haruyuki Urushihata, Chiryu (JP)

(73) Assignee: Denso Corporation, Kariya (JP)

( * ) Notice: Subject to any disclaimer, the term of this patent is extended or adjusted under 35 U.S.C. 154(b) by 355 days.

(21) Appl. No.: 12/852,273

(22) Filed: Aug. 6, 2010

(65) Prior Publication Data

US 2011/0035134 A1  Feb. 10, 2011

(30) Foreign Application Priority Data

Aug. 7, 2009  (JP) .................................. 2009-184344

(51) Int. Cl.
   *F01L 1/34* (2006.01)
(52) U.S. Cl.
   USPC .................... 123/90.17; 123/90.15; 123/90.31
(58) Field of Classification Search ............... 123/90.15, 123/90.17, 90.31
   See application file for complete search history.

(56) References Cited

U.S. PATENT DOCUMENTS 6,330,870 B1 * 12/2001 Inoue et al. ................ 123/90.17
2002/0139332 A1  10/2002 Takenaka

FOREIGN PATENT DOCUMENTS

| JP | 8-200020 | 8/1996 |
| JP | 11-210424 | 8/1999 |
| JP | 2002357105 A * | 12/2002 |
| JP | P2005-98217 A | 4/2005 |
| JP | P2006-220154 A | 8/2006 |

OTHER PUBLICATIONS

Machine Translation of JP08-200020A.*
Machine Translation of JP2005-098217A.*
Machine Translation of JP11-210424A.*
U.S. Appl. No. 12/828,793, filed Jul. 1, 2010, Urushihata et al.
U.S. Appl. No. 12/852,283, Urushihata, filed Aug. 6, 2010.
Japanese Office Action dated Jul. 3, 2012, issued in corresponding Japanese Application No. 2009-184344 with English translation.

* cited by examiner

*Primary Examiner* — Zelalem Eshete
(74) *Attorney, Agent, or Firm* — Nixon & Vanderhye P.C.

(57) ABSTRACT

A valve timing control apparatus for a valve timing adjusting unit that adjusts valve timing of an engine. The control apparatus learns a reference position. The control apparatus computes an actual phase based on the learned reference position. The control apparatus computes a target phase based on an engine operational state. The control apparatus controls a hydraulic actuator to perform a phase control based on a difference between the target phase and the actual phase. The control apparatus determines whether the lock mechanism is under an abnormal state. When the control apparatus determines that the lock mechanism is under the abnormal state, the control apparatus is prohibited from performing the phase control that uses the reference position.

8 Claims, 9 Drawing Sheets

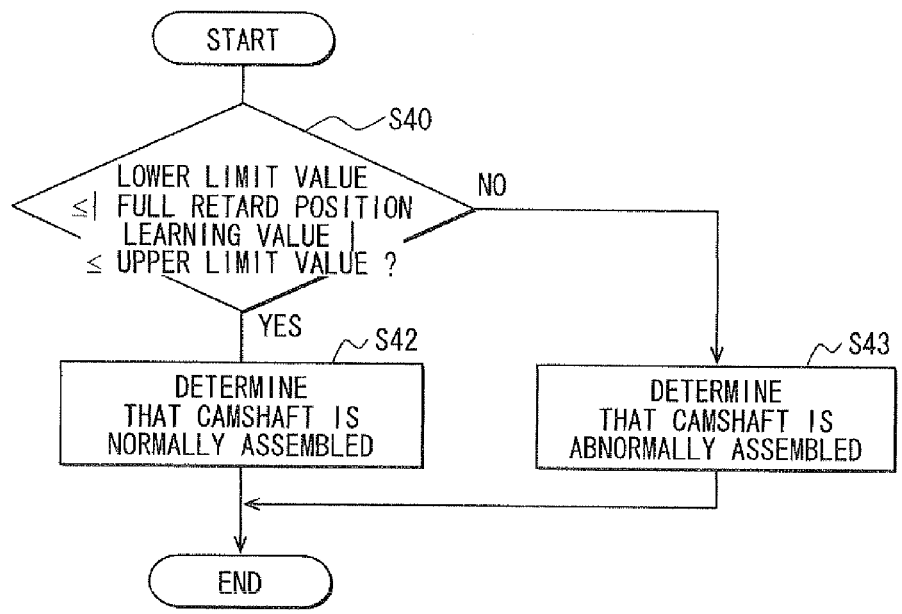
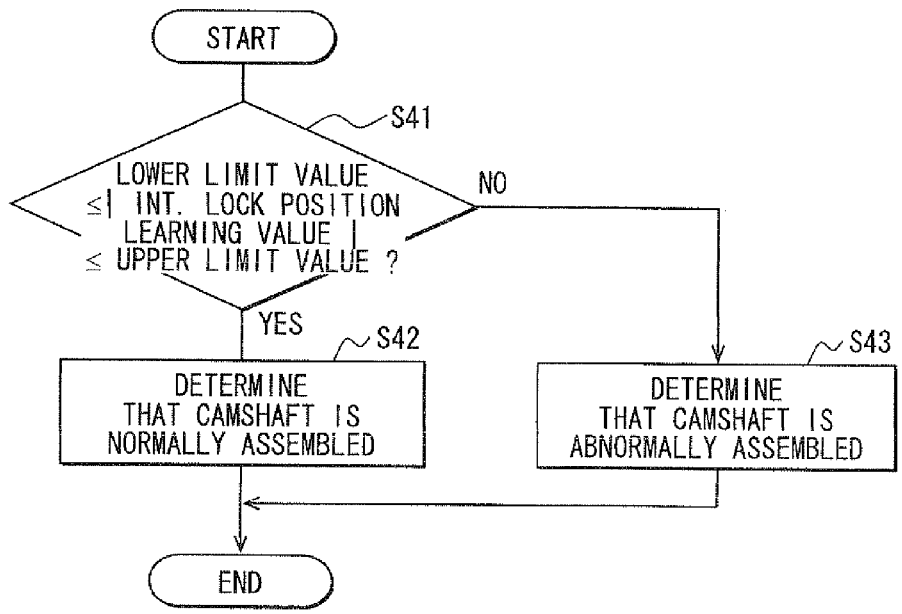

VALVE TIMING CONTROL APPARATUS

CROSS REFERENCE TO RELATED APPLICATION

This application is based on and incorporates herein by reference Japanese Patent Application No. 2009-184344 filed on Aug. 7, 2009.

BACKGROUND OF THE INVENTION

1. Field of the Invention

The present invention relates to a valve timing control apparatus for a valve timing adjusting unit that adjusts timing of opening and closing an intake valve or an exhaust valve of an engine.

2. Description of Related Art

A conventional valve timing adjusting unit includes a housing (first rotor), and a vane rotor (second rotor). The housing is rotatable synchronously with one of an engine output shaft and a camshaft that opens and closes an intake valve or an exhaust valve. The vane rotor is rotatable synchronously with the other one of the output shaft and the camshaft. Also, the housing has therein advance hydraulic chambers and retard hydraulic chambers defined by vanes of the vane rotor. Then, a phase control is performed to adjust a relative rotational position (relative rotational phase) of the vane rotor relative to the housing by adjusting pressure of hydraulic oil supplied to both hydraulic chambers in order to adjust timing of opening and closing the valve.

However, in a case, where a drive source of a hydraulic pump that supplies hydraulic oil serves as the engine output shaft, the hydraulic oil may not be substantially supplied immediately after the starting of the engine. Then, the relative rotational phase may be substantially varied due to the change of the vane rotor that is subjected to variable torque (torque reversal) applied through the camshaft caused by a valve spring of the intake valve or the exhaust valve.

Thus, in the conventional apparatus described in JP-A-2002-357105 (corresponding to US20020139332), the vane rotor is provided with a lock pin, and the housing is provided with a lock hole. When a projection condition is satisfied, the lock pin is displaced from a retraction position within the vane rotor to a projection position such that the lock pin projects from the vane rotor. When the lock pin located at the projection position is fitted into or engaged with the lock hole, the relative rotational phase of the vane rotor is locked such that the vane rotor is prevented from rotating relative to the housing. As a result, if a lock control is executed, in which the relative rotational phase is controlled such that the lock pin is engaged with the lock hole, during the stopping of the engine, the relative rotational phase has bee locked accordingly at the start of the engine in the next operation. As a result, it is possible to prevent the wide change of the relative rotational phase.

Then, when it becomes possible to supply substantial amount of hydraulic oil after the engine start, the lock pin is retracted to be received in the vane rotor such that the lock of the relative rotational phase is released. Subsequently, the feed-back control is executed, in which the phase control is controlled based on a difference between the actual phase and the target phase computed in accordance with the engine operational state.

In order to detect the actual phase for the execution of the above feed-back control, it is required to obtain a reference phase (reference position). Conventionally, in the execution of the feed-back control after the release of the lock, the phase is forcibly controlled to the full retard position, and the position of the shifted phase is learned as the reference position.

In a conventional valve timing adjusting unit, it is generally designed that the phase is locked to the full retard position. However, in a recent apparatus, the phase is alternatively locked to a position between the full retard position and the full advance position, and the inventor of the present invention has found the following disadvantages in the recent apparatus.

In other words, the lock pin may fall under an immovable abnormality state, in which the lock pin becomes immovable at the projection position and thereby the lock pin is prevented from being received in the vane rotor at the retraction position. When the above learning operation is executed under the immovable abnormality state, in which the phase is locked to the full retard position, the erroneous learning will not happen. However, when the above learning operation is executed under the immovable abnormality state, in which the phase is locked to the intermediate lock position, the reference position is erroneously learned while the actual phase is erroneously at the intermediate lock position instead of the full retard position, and thereby the feed-back control may be executed based on the erroneous reference position disadvantageously.

SUMMARY OF THE INVENTION

The present invention is made in view of the above disadvantages. Thus, it is an objective of the present invention to address at least one of the above disadvantages.

To achieve the objective of the present invention, there is provided a valve timing control apparatus for a valve timing adjusting unit that adjusts valve timing of opening and closing one of an intake valve and an exhaust valve of an engine having a camshaft and an output shaft. The camshaft opens and closes the one of the intake valve and the exhaust valve. The valve timing adjusting unit includes a first rotor, a second rotor, a hydraulic actuator, and a lock mechanism. The first rotor is rotatable synchronously with one of the camshaft and the output shaft. The second rotor is rotatable synchronously with the other one of the camshaft and the output shaft. The hydraulic actuator changes a relative rotational phase between the first rotor and the second rotor. The lock mechanism is configured to lock the relative rotational phase at an intermediate position located between a full retard position and a full advance position such that the relative rotational phase is unchanged. The valve timing adjusting unit adjusts the valve timing by controlling the hydraulic actuator to perform a phase control for controlling the relative rotational phase. The valve timing control apparatus includes reference position learning means, actual phase computing means, target phase computing means, feed-back controlling means, abnormality determining means. The reference position learning means learns, as a reference position, one of (a) a first position of the relative rotational phase that is controlled through the phase control at the full retard position; and (b) a second position of the relative rotational phase that is locked by the lock mechanism at the intermediate position. The actual phase computing means computes an actual phase based on the learned reference position. The target phase computing means computes a target phase based on an operational state of the engine. The feed-back controlling means controls the hydraulic actuator to perform the phase control based on a difference between the target phase and the actual phase. The abnormality determining means determines whether the lock mechanism is under an abnormal state.

When the abnormality determining means determines that the lock mechanism is under the abnormal state, the feed-back controlling means is prohibited from performing the phase control that uses the reference position.

BRIEF DESCRIPTION OF THE DRAWINGS

The invention, together with additional objectives, features and advantages thereof, will be best understood from the following description, the appended claims and the accompanying drawings in which:

FIG. 7A is a flow chart illustrating a procedure for determining whether a camshaft is normally assembled according to the third embodiment of the present invention;

FIG. 7B is another flow chart illustrating a procedure for determining whether the camshaft is normally assembled according to the third embodiment of the present invention;

DETAILED DESCRIPTION OF PREFERRED EMBODIMENTS

Each embodiment of the present invention will be described below with reference to accompanying drawings. It should be noted that similar components of one embodiment, which are similar to the components of the other embodiment, will be designated by the same numerals, and the explanation thereof will be omitted.

First Embodiment

Figure 1:
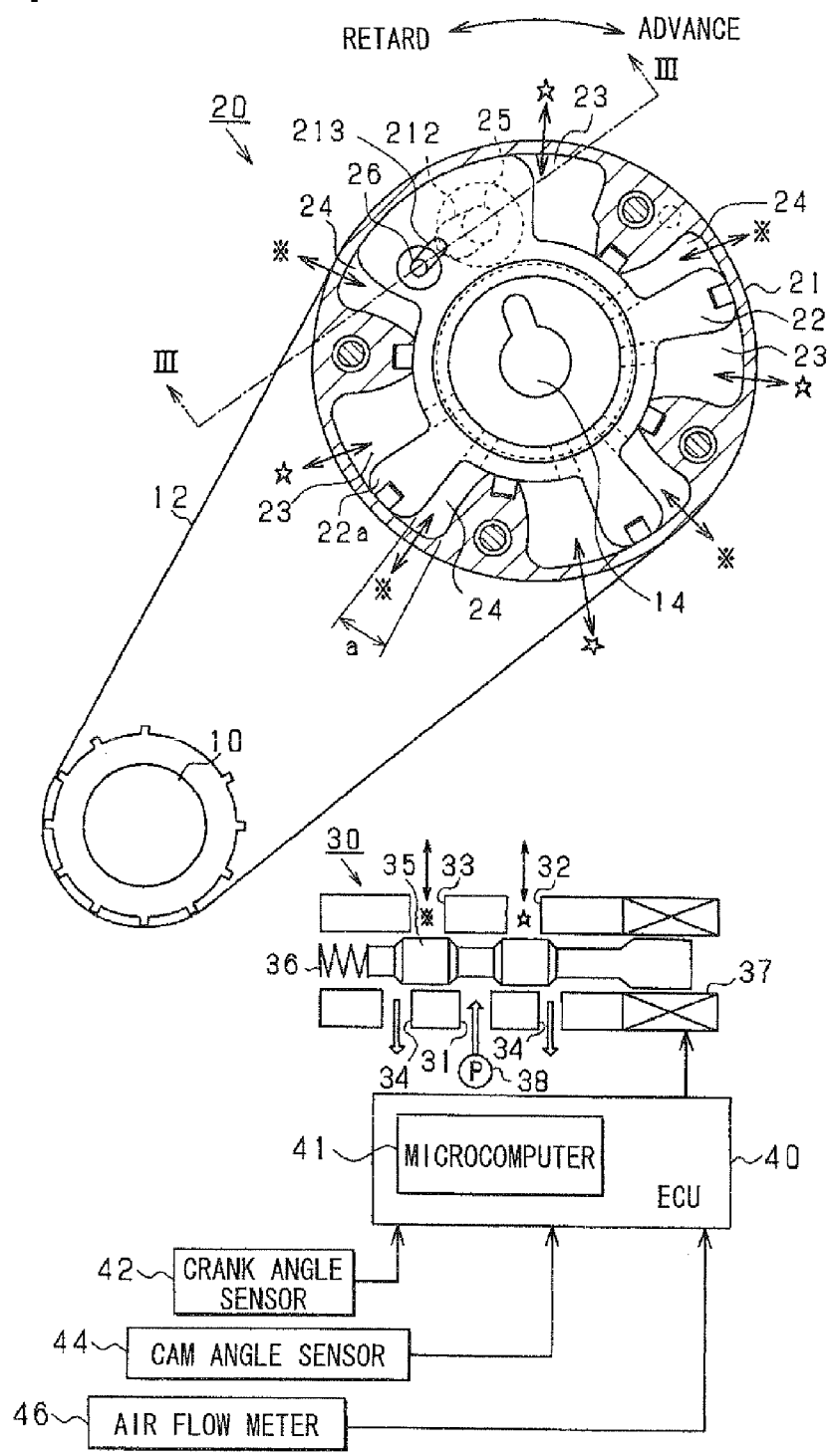
FIG. 1 is a diagram illustrating a general configuration of a valve timing adjusting unit according to the first embodiment of the present invention.

FIG. 1 is a general configuration illustrating a valve timing adjusting unit of the present embodiment.

As shown in FIG. 1, a drive force of a crankshaft 10 (output shaft) of an engine is transmitted to a camshaft 14 through a belt 12 and a valve timing adjusting unit (VVT) 20. The VVT 20 includes a first rotor 21 (housing) and a second rotor 22 (vane rotor). The first rotor 21 is mechanically coupled to the crankshaft 10, and the second rotor 22 is mechanically coupled to the camshaft 14. In the present embodiment, the second rotor 22 has multiple projection portions 22a (vane), and is received within the first rotor 21. The projection portions 22a of the second rotor 22 and an inner wall of the first rotor 21 define therebetween retard chambers 23 and advance chambers 24. The retard chambers 23 cause a rotation angle (relative rotational phase) of the camshaft 14 relative to the crankshaft 10 to be shifted in a retard direction, and the advance chambers 24 cause the relative rotational phase to be shifted in an advance direction, for example.

Also, the VVT 20 further includes a lock mechanism that locks the first rotor 21 and the second rotor 22 at an intermediate position such that the first rotor 21 is incapable of rotating relative to the second rotor 22. For example, the intermediate position is located between a full retard position and a full advance position. The retard chambers 23 have maximum volume when the relative rotational phase is at the full retard position, and the advance chambers 24 have maximum volume when the relative rotational phase is at the full advance position. The lock mechanism will be described later.

The VVT 20 serves as a hydraulic actuator and has an oil control valve (OCV) 30 that controls circulation of hydraulic oil between the retard chambers 23 and the advance chambers 24.

The OCV 30 supplies hydraulic oil to the retard chambers 23 or the advance chambers 24 from a hydraulic pump 38 through a supply route 31 and a retard route 32 or an advance route 33. The OCV 30 drains hydraulic oil to an oil pan through the retard chambers 23, the retard route 32, and a drain route 34, or through the advance chambers 24, the advance route 33, and the drain route 34.

A spool 35 is urged by a spring 36 rightward in FIG. 1 (in a direction from the advance route 33 toward the retard route 32), and an electromagnetic solenoid 37 provides a force that urges the spool 35 leftward in FIG. 1. Thus, by adjusting a duty (Duty) of a control electric current (control command value) applied to the electromagnetic solenoid 37, it is possible to control a position of the spool 35, and thereby it is possible to cause the spool 35 to adjust flow channel areas between (a) one of the retard route 32 and the advance route 33 and (b) one of the supply route 31 and the drain route 34.

For example, when the spool 35 is displaced from a position shown in FIG. 1 in a right direction, hydraulic oil is supplied to the retard chambers 23 from the hydraulic pump 38 through the supply route 31 and the retard route 32, and hydraulic oil in the advance chambers 24 is drained to the oil pan through the advance route 33 and the drain route 34. As a result, the second rotor 22 rotates counterclockwise relative to the first rotor 21 in FIG. 1, and thereby the relative rotational phase is shifted in the retard direction.

In contrast, when the spool 35 is displaced from the shown position in a left direction, hydraulic oil is supplied to the advance chambers 24 from the hydraulic pump 38 through the supply route 31 and the advance route 33, and hydraulic oil in the retard chambers 23 is drained to the oil pan through the retard route 32 and the drain route 34. As a result, the second rotor 22 rotates clockwise relative to the first rotor 21, and thereby the relative rotational phase is shifted in the advance direction.

Note that when the spool 35 is located at the position shown in FIG. 1 such that the spool 35 closes the retard route 32 and the advance route 33, circulation of hydraulic oil between the retard chambers 23 and the advance chambers 24 is prohibited, and thereby the relative rotational phase is held. The duty value of the control electric current at the above state, where the relative rotational phase is held, is referred to as a hold Duty value (hold value).

An electronic control unit (ECU) 40 mainly includes a microcomputer 41, and adjusts the duty of the control electric current applied to the electromagnetic solenoid 37. The ECU 40 obtains detection values of various operational state of the internal combustion engine, such as a detection value of a crank angle sensor 42, which detects a rotation angle of the crankshaft 10, a detection value of a cam angle sensor 44, which detects a rotation angle of the camshaft 14, and a detection value of an air flow meter 46, which detects an intake air amount. The ECU 40 performs various computation based on the above various detection values, and controls various actuators, such as the OCV 30, of the internal combustion engine based on the computation result.

For example, the ECU 40 computes an engine rotational speed NE based on the detection value of the crank angle sensor 42, and computes an intake amount (engine load) based on the detection value of the air flow meter 46. Also, the ECU 40 computes an actual relative rotational phase (actual phase) based on the detection values of the crank angle sensor 42 and the cam angle sensor 44. Then, the ECU 40 computes a target phase based on the computed engine rotational speed NE and engine load. For example, when the internal combustion engine is operated under a normal operational range (medium load and medium NE), the target phase is computed such that a valve overlap, in which the intake valve and the exhaust valve are both opened, is increased in order to facilitate the improvement of fuel efficiency of the internal combustion engine and the reduction of the emission. In contrast, when the internal combustion engine is operated under a stand-by operation (low load and low NE), the target phase is computed to reduce the valve overlap such that combustion of the internal combustion engine is stabilized. Furthermore, the ECU 40 executes the feed-back control such that the difference between the actual phase and the target phase becomes zero.

The ECU 40 adjusts the duty of the control electric current applied to the electromagnetic solenoid 37 based on the target phase, and thereby adjusting the relative rotational phase of the VVT 20. As a result, the relative rotational phase of the camshaft 14 relative to the crankshaft 10 is adjusted. As a result, opening and closing timing of the exhaust valve or the intake valve of the internal combustion engine is adjusted, and thereby the valve overlap is adjusted. In the present embodiment, the VVT 20 is provided to the camshaft 14 that actuates the intake valve, and is not provided to the other camshaft that actuates the exhaust valve. However, the present embodiment is applicable to the VVT 20 that is provided to at least one of the camshafts of the intake and exhaust valves.

Figure 2:
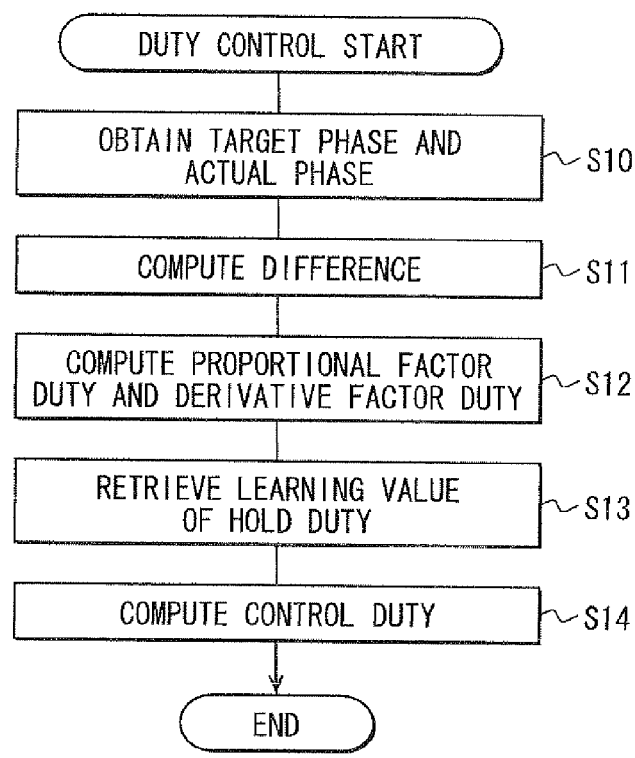
FIG. 2 is a flow chart illustrating a procedure for computing a control Duty value in a duty control of a control electric current according to the first embodiment.

FIG. 2 is a flow chart illustrating a procedure for computing a control Duty used in the control of control Duty or duty of the control electric current applied by the microcomputer 41 of the ECU 40 to the electromagnetic solenoid 37. The above process is repeatedly executed at predetermined intervals after start upon the turning on of the ignition switch.

Firstly, at step S10 (corresponding to target phase computing means) in FIG. 2, the actual phase of the VVT 20, which is computed based on the detection values from the crank angle sensor 42 and the cam angle sensor 44, is obtained. Also, the target phase, which is computed based on the engine rotational speed NE and the engine load as above, is obtained. Then, control proceeds to step S11, where the difference between the target phase and the actual phase, which are obtained at step S10, is computed.

Control proceeds to step S12, where a proportional factor Duty and a derivative factor Duty used in the feed-back control are computed based on the difference computed at step S10. Specifically, the proportional factor Duty (feed-back correction value) is computed in proportion to the difference, and the derivative factor Duty (feed-back correction value) is computed in proportion to the rate of change of the difference.

In the present embodiment, a hold Duty refers to the value of the control Duty for a state, where an operational speed of the VVT 20 is zero, or in other words, where the actual phase of the VVT 20 is held substantially at a constant value. The hold Duty value is sequentially learned (stored and updated) in a routine process other than that in FIG. 2. Then, the learning value of the hold Duty is retrieved at step S13 in FIG. 2.

In the next step S14 (feed-back controlling means), the control Duty of the electric current applied to the electromagnetic solenoid 37 is computed based on the proportional factor Duty, the derivative factor Duty, and the learning value of the hold Duty obtained at steps S12, S13. Specifically, the value for the control Duty is obtained by adding the proportional factor Duty and the derivative factor Duty to the hold Duty learning value.

Figure 3:
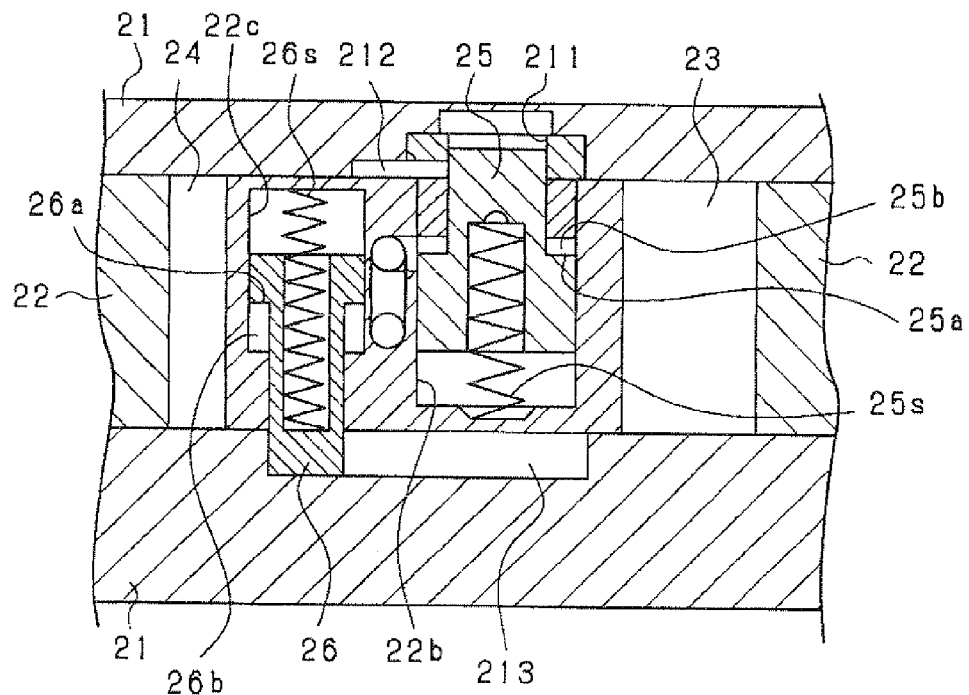
FIG. 3 is a cross-sectional view taken along lines in FIG. 1.

FIG. 3 is a cross-sectional view of the VVT 20 taken along lines in FIG. 1, and the lock mechanism of the VVT 20 will be described below with reference to FIGS. 1 and 3. The lock mechanism mainly includes a lock pin 25, a lock hole 211, a guide groove 212, a limitation pin 26, and a limitation groove 213.

The lock pin 25 is displaceably provided to a receiving hole 22b formed at the second rotor 22. FIG. 3 illustrates a state, in which the lock pin 25 projects from the receiving hole 22b. The receiving hole 22b is provided with a spring 25s that applies a resilient force to the lock pin 25 such that the spring 25s urges the lock pin 25 toward a projection position in a projection direction.

Also, the lock pin 25 is provided with a pressure receiver 25a. When the pressure receiver 25a receives pressure of hydraulic oil that flows into a control chamber 25b, the lock pin 25 is urged in a direction (retraction direction) opposite from the projection direction such that the lock pin 25 is retracted to be received in the receiving hole 22b at a retraction position. Because it is designed that part of hydraulic oil discharged from the hydraulic pump 38 is supplied to the control chamber 25b, hydraulic oil pressure of the control chamber 25b has become sufficiently increased after a predetermined time period has elapsed since the hydraulic pump 38 starts operation upon the start of the engine. When hydraulic oil pressure in the control chamber 25b is increased to exceeds the resilient force of the spring 25s, the lock pin 25 is displaced from the projection position to the retraction position such that the entirety of the lock pin 25 is received by the receiving hole 22b. In contrast, when hydraulic oil pressure is reduced to below the resilient force of the spring 25s upon the stop of the engine, the resilient force of the spring 25s causes the lock pin 25 to be displaced from the retraction position to the projection position.

It should be noted that the circulation (inflow and outflow) of hydraulic oil to the control chamber 25b is controlled by an OCV (not shown) other than the OCV 30. In other words, the circulation of hydraulic oil to the control chamber 25b is controlled independently of the control of circulation of hydraulic oil to the retard chambers 23 and the advance chambers 24. However, it should be noted that the OCV 30 in FIG. 1 may be alternatively replaced by a single OCV that is provided with an inflow port and a drain port to the control chamber 25b, and thereby the above alternative OCV may control the flow of hydraulic oil to the control chamber 25b, the retard chambers 23, and the advance chambers 24.

The lock hole 211 is formed to the first rotor 21 at a position such that the lock hole 211 is opposed to an end of the lock pin 25. When the relative rotational phase is at a predetermined lock position, the end part of the lock pin 25, which is located at the projection position, is designed to be engaged with the lock hole 211. When the lock pin 25 is fitted into or engaged with the lock hole 211, the rotors 21, 22 are locked such that one of the rotors 21, 22 is prevented from rotating relative to the other one of the rotors 21, 22.

When the engine is to be stopped, the target phase is determined in order to bring the lock pin 25 into the engagement with the lock hole 211 such that the actual phase (actual position of the relative rotational phase) coincides with the lock position. The above control may be referred to as a lock control. As a result, because the relative rotational phase has been locked in the starting of the engine in the next operation, it is possible to hold the relative rotational phase at the lock position without a large fluctuation of the relative rotational phase even in a period immediately after the start of the engine. It should be noted that as shown in FIG. 4B, a lock position Pr of the present embodiment is set at an intermediate position in a range W0, in which the relative rotational phase is changeable.

The first rotor 21 further has the guide groove 212 formed at a position such that the end part of the lock pin 25 located at the projection position is engageable with the guide groove 212. The guide groove 212 has an arc shape such that the lock pin 25 is displaceable in a predetermined angular range. As a result, when the lock pin 25 is fitted into the guide groove 212, a displacement range of the lock pin 25 is limited to a first limitation range W1 (see FIG. 4B). In other words, the relative rotation range of the second rotor 22, to which the lock pin 25 is provided, relative to the first rotor 21 is limited to the first limitation range W1.

Figure 4A:
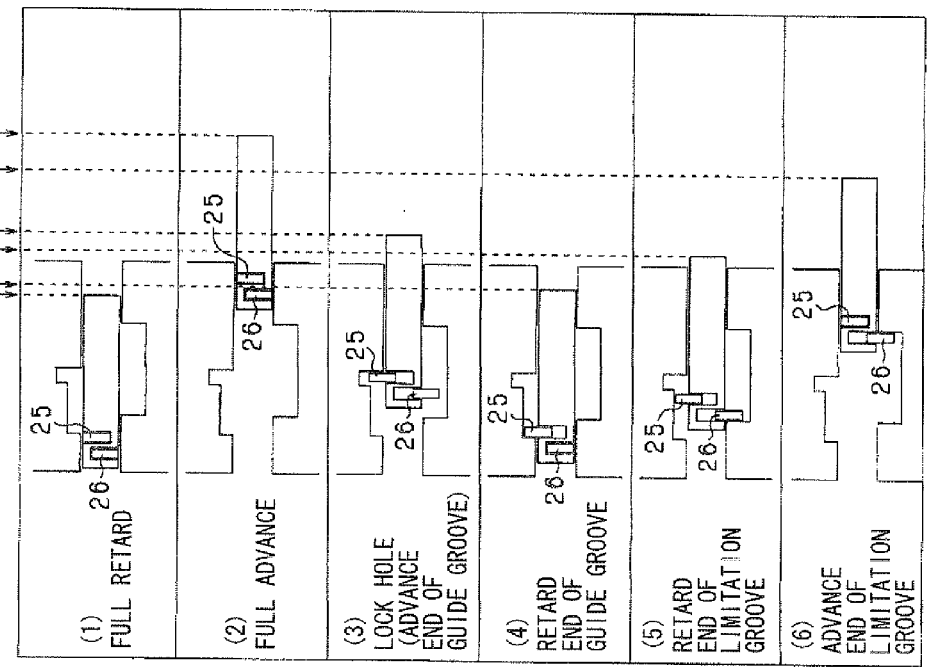
FIG. 4A is a schematic diagram illustrating a state, where a lock pin is fitted into a lock hole, according to the first embodiment.
Figure 4B:
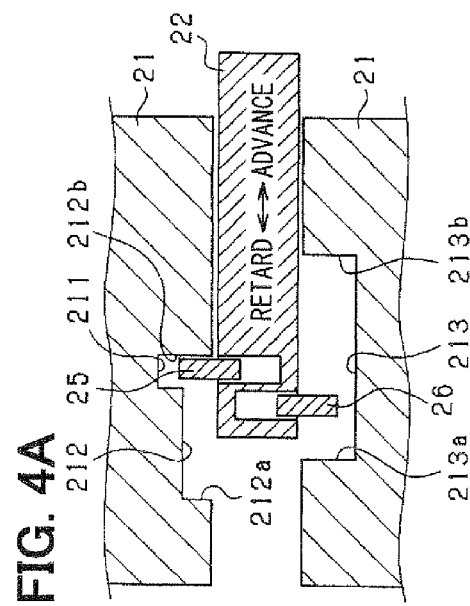
FIG. 4B is a diagram illustrating a relation between a first limitation range and a second limitation range according to the first embodiment.

The lock hole 211 is formed to at a full advance position Pr within a groove bottom surface of the guide groove 212 (see FIG. 4B). As shown in FIG. 3, a hole depth of the lock hole 211 is deeper than a groove depth of the guide groove 212. As a result, the lock pin 25 projects to be located at two projection positions. When the lock pin 25, which is engaged with the guide groove 212, is displaced to the position (the lock position Pr) of the lock hole 211, the lock pin 25 further projects to be engaged with the lock hole 211.

The limitation pin 26 is provided such that the limitation pin 26 is displaced into and out of a receiving hole 22c formed to the second rotor 22. FIG. 3 illustrates a state, in which the limitation pin 26 projects from the receiving hole 22c in a projection direction. The receiving hole 22c is provided with a spring 26s that applies a resilient force to the limitation pin 26 such that the limitation pin 26 is urged in the projection direction. It should be noted that the limitation pin 26 projects from the second rotor 22 in a direction opposite from a direction, in which the lock pin 25 projects from the second rotor 22.

Also, the limitation pin 26 has a pressure receiver 26a formed thereto. The pressure receiver 26a receives pressure of hydraulic oil that flows into a control chamber 26b such that the limitation pin 26 is urged in a direction opposite from the projection direction. In other words, when the pressure receiver 26a receives pressure of hydraulic oil, the limitation pin 26 is urged in a direction to be received in the receiving hole 22c. It is designed that part of hydraulic oil discharged from the hydraulic pump 38 is supplied to the control chamber 26b. Thereby, when hydraulic oil pressure in the control chamber 26b is increased to exceed the resilient force of the spring 26s, the limitation pin 26 is displaced from the projection position to the retraction position such that the entirety of the limitation pin 26 is received in the receiving hole 22c. In contrast, when hydraulic oil pressure is reduced to below the resilient force of the spring 26s, the resilient force of the spring 26s causes the limitation pin 26 to be displaced from the retraction position to the projection position.

It should be noted that the control chamber 26b of the limitation pin 26 is communicated with the control chamber 25b of the lock pin 25. When hydraulic oil pressure is less than a predetermined value, the limitation pin 26 projects, and the lock pin 25 projects. The above condition of the hydraulic oil pressure corresponds to a lock pin projection condition and a limitation pin projection condition. The lock pin projection condition coincides with the limitation pin projection condition, for example. Also, when hydraulic oil pressure is equal to or greater than a predetermined value, and an OCV operates to supply hydraulic oil to the control chambers 25b, 26b, the limitation pin 26 is retracted and the lock pin 25 is retracted. The above condition of the hydraulic oil pressure and the OCV serves as a lock pin retraction condition and a limitation pin retraction condition. The lock pin retraction condition coincides with the limitation pin retraction condition, for example.

The first rotor 21 has the limitation groove 213 located at a position opposed to the end of the limitation pin 26. When the limitation pin 26 is located at the projection position, the end part of the limitation pin 26 is engaged with the limitation groove 213. The limitation groove 213 has an arc shape such that the limitation pin 26 is displaceable in a predetermined angular range. As a result, when the limitation pin 26 is fitted into or engaged with the limitation groove 213, a displacement range of the limitation pin 26, in which range the limitation pin 26 is displaceable, is limited to a second limitation range W2 (see FIG. 4B). In other words, the relative rotation range of the second rotor 22, to which the limitation pin 26 is formed, relative to the first rotor 21 is limited to the second limitation range W2. It should be noted that the second limitation range W2 is different from the first limitation range W1 and includes the lock position Pr as shown in FIG. 4B.

Next, technical feature of the guide groove 212 and the limitation groove 213 will be described below.

When the above lock control is executed, the lock pin 25 is displaced toward the lock hole 211. More specifically, the lock pin 25 is displaced toward the lock hole 211 while the lock pin 25 fluctuates in the advance direction and in the retard direction due to the variable torque (torque reversals) applied to the camshaft 14 by a valve spring. As a result, the lock pin 25 may not be fitted into the lock hole 211 depending on the fluctuation disadvantageously in the conventional art.

In contrast, in the present embodiment, because there are provided the guide groove 212 and the limitation groove 213, the relative rotation range is limited as above, and thereby it is possible to displace the lock pin 25 toward the lock hole 211 while the range of the fluctuation is limited. As a result, it is possible to facilitate the fitting of the lock pin 25 into the lock hole 211, and thereby it is possible to effectively remove the above disadvantage of the conventional art.

Figure 4C:
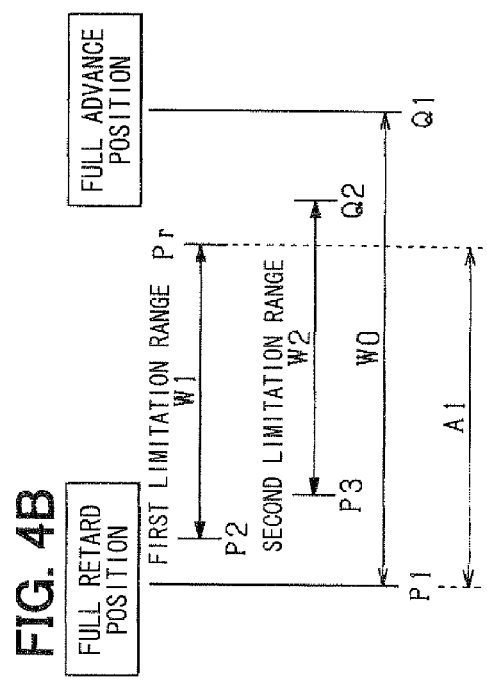
FIG. 4C is a diagram illustrating change of the lock pin and a limitation pin according to the first embodiment.

The above advantage will be detailed with reference to FIGS. 4A to 4C. FIG. 4A is a schematic diagram illustrating a state, where the lock pin 25 is fitted into the lock hole 211, FIG. 4B is a diagram illustrating a relation between the relative rotation range W0, the first limitation range W1 and the second limitation range W2. As described above, the relative rotation range W0 corresponds to a range for a case, where both of the pins 25, 26 are located at the respective retraction positions. The first limitation range W1 is defined by the guide groove 212, and the second limitation range W2 is defined by the limitation groove 213. Each of (1) to (6) in FIG. 4C is a diagram illustrating a change of the state of the lock pin 25 and the limitation pin 26.

Firstly, the operation for the case, where both of the pins 25, 26 are located at the respective retraction positions or both of the pins 25, 26 are received within the second rotor 22, will be described. As shown by (1) and (2) in FIG. 4C, when both of the pins 25, 26 are located at the retraction positions, the relative rotational phase is freely displaceable in a range (the relative rotation range W0) between the full retard position P1 and the full advance position Q1. Thus, it is possible to set the target phase within the relative rotation range W0.

Next, the operation for the case, where the lock control of both of the pins 25, 26 is executed. In the present embodiment, the lock pin 25 is displaced from a position on the retard side of the lock hole 211 toward the lock hole 211 such that it is possible to bring a side surface of the lock pin 25 into contact with an advance-end wall surface 212b of the guide groove 212 in order to bring the end part of the lock pin 25 into the engagement with the lock hole 211.

Firstly, the lock pin 25 is displaced in the advance direction in a state, where the lock pin 25 is located at a position on a retard side of a retard-end wall surface 212a of the guide groove 212. Then, as shown in (4) in FIG. 40, the lock pin 25 is brought into the engagement with the guide groove 212. At this time, although the lock pin 25 is urged in the retard direction by some force, the lock pin 25 is prevented from being displaced in the retard direction further from the end of the guide groove 212 because of the contact between the retard-end wall surface 212a of the guide groove 212 and the side surface of the lock pin 25. In other words, the phase of the VVT 20 (relative rotational phase) is prevented from being shifted in the retard direction further from the position P2 that corresponds to the retard-end wall surface 212a of the guide groove 212 (see FIG. 4B).

Next, when the advance operation is further executed as shown in (5) in FIG. 40, the limitation pin 26 is brought into the engagement with the limitation groove 213. At this time, although the limitation pin 26 may be urged in the retard direction by some force, the limitation pin 26 is prevented from being shifted in the retard direction further from the end of the limitation groove 213 because of the contact between a retard-end wall surface 213a of the limitation groove 213 and a side surface of the limitation pin 26. In other words, the phase of the VVT 20 is prevented from being shifted in the retard direction further from the position P3 that corresponds to the retard-end wall surface 213a of the limitation groove 213 (see FIG. 4B).

Next, when the advance operation is further executed, the side surface of the lock pin 25 contacts the advance-end wall surface 212b of the guide groove 212, and the lock pin 25 is brought into the engagement with the lock hole 211.

In contrast, when the retard operation is further executed in a state, where the lock pin 25 is located at a position on an advance side of the advance-end wall surface 212b of the guide groove 212, the limitation pin 26 is brought into the engagement with the limitation groove 213 as shown in (6) in FIG. 4C. In this case, although the limitation pin 26 may be urged in the advance direction by some force, the limitation pin 26 is prevented from being displaced in the advance further from the end of the limitation groove 213 because of the contact between an advance-end wall surface 213b of the limitation groove 213 and the side surface of the limitation pin 26. In other words, phase of the VVT 20 (relative rotational phase) is prevented from being shifted in the advance direction further from the position Q2 that corresponds to the advance-end wall surface 213b of the limitation groove 213 (see FIG. 4B).

Next, when the retard operation is further executed, the lock pin 25 may pass the lock hole 211 to a position on the retard side of the lock hole 211. However, the side surface of the lock pin 25 is brought into contact with the advance-end wall surface 212b of the guide groove 212 by subsequently executing the advance operation, and thereby the lock pin 25 is successfully brought into the engagement with the lock hole 211.

In the present embodiment, as shown in FIG. 4B, the position Q2 of the advance-end wall surface 213b of the limitation groove 213 is located on the advance side of the lock position Pr, and also the position P3 of the retard-end wall surface 213a of the limitation groove 213 is located on the advance side of the position P2 of the retard-end wall surface 212a of the guide groove 212. It should be noted that the position P3 may be located on the retard side of the position P2.

In the execution of the feed-back control in order to cause the difference between the actual phase and the target phase to be zero, the detection of the actual phase is needed. Also, in the computation of the actual phase based on the detection values of the crank angle sensor 42 and the cam angle sensor 44, it is required to obtain the reference position. Thus, in the feed-back control, the reference position is required. In the present embodiment, the phase of the VVT 20, which is controlled to the full retard position, is learned as the reference position.

Specifically, after hydraulic oil is supplied to the retard chambers 23 for equal to or greater than a predetermined time, a phase difference between the crank angle and the cam angle is obtained. Thus obtained phase difference is learned as the reference position. Then, the actual phase is obtained based on a difference between (a) the above learned reference position and (b) a phase difference between the crank angle and the cam angle during the feed-back control. For example, the number of pulses between (a) a pulse of the crank angle signal, which corresponds to a toothless part, and (b) a pulse of the cam angle signal, which corresponds to a toothless part, may be learned as the reference position.

However, the lock pin 25 and the limitation pin 26 may become temporarily immovable at the projection position or at the retraction position. For example, in a case, where hydraulic oil supplied to the control chambers 25b, 26b erroneously includes foreign objects therein, the foreign objects may be trapped between the wall surface of the control chambers 25b, 26b and the side surfaces of both of the pins 25, 26, and thereby the lock pin 25 and the limitation pin 26 may become temporarily immovable. Then, in a case of an immovable projection abnormality, where at least one of the pins 25, 26 projection position is immovable at the projection position, the phase range may be erroneously limited to the first limitation range W1 or to the second limitation range W2 or may be erroneously locked to the lock position even when a retraction condition is satisfied. In contrast, in another case of an immovable retraction abnormality, in which at least one of the pins 25, 26 is immovable at the retraction position, it becomes impossible to limit the phase range to the first limitation range W1 or to the second limitation range W2 even when the projection condition is satisfied. Moreover, in the case of the immovable retraction abnormality, it becomes impossible to lock the phase range to the lock state even when the projection condition is satisfied.

In case of the immovable projection abnormality, when the phase, which is controlled by the VVT 20 to the full retard position, is attempted to be learned as the reference position, the lock position may be erroneously learned as the reference position instead of the full retard position. Also, a full retard end in the first limitation range W1 may be erroneously learned as the reference position, or a full retard end in the second limitation range W2 may be erroneously learned as the reference position.

For example, in an abnormal example, where the lock mechanism is incapable of releasing the lock of the relative rotational phase, even when the full retard position is attempted to be learned as the reference position, the intermediate position (lock position) would be erroneously learned as the reference position in place of the full retard position. Also, in another abnormal example, where the lock mechanism is incapable of locking the relative rotational phase, even when the phase (or the lock position) at a time of starting the engine is attempted to be learned as the reference position, the other phase that is different from the lock position would be erroneously learned as the intermediate position (lock position).

Figure 5:
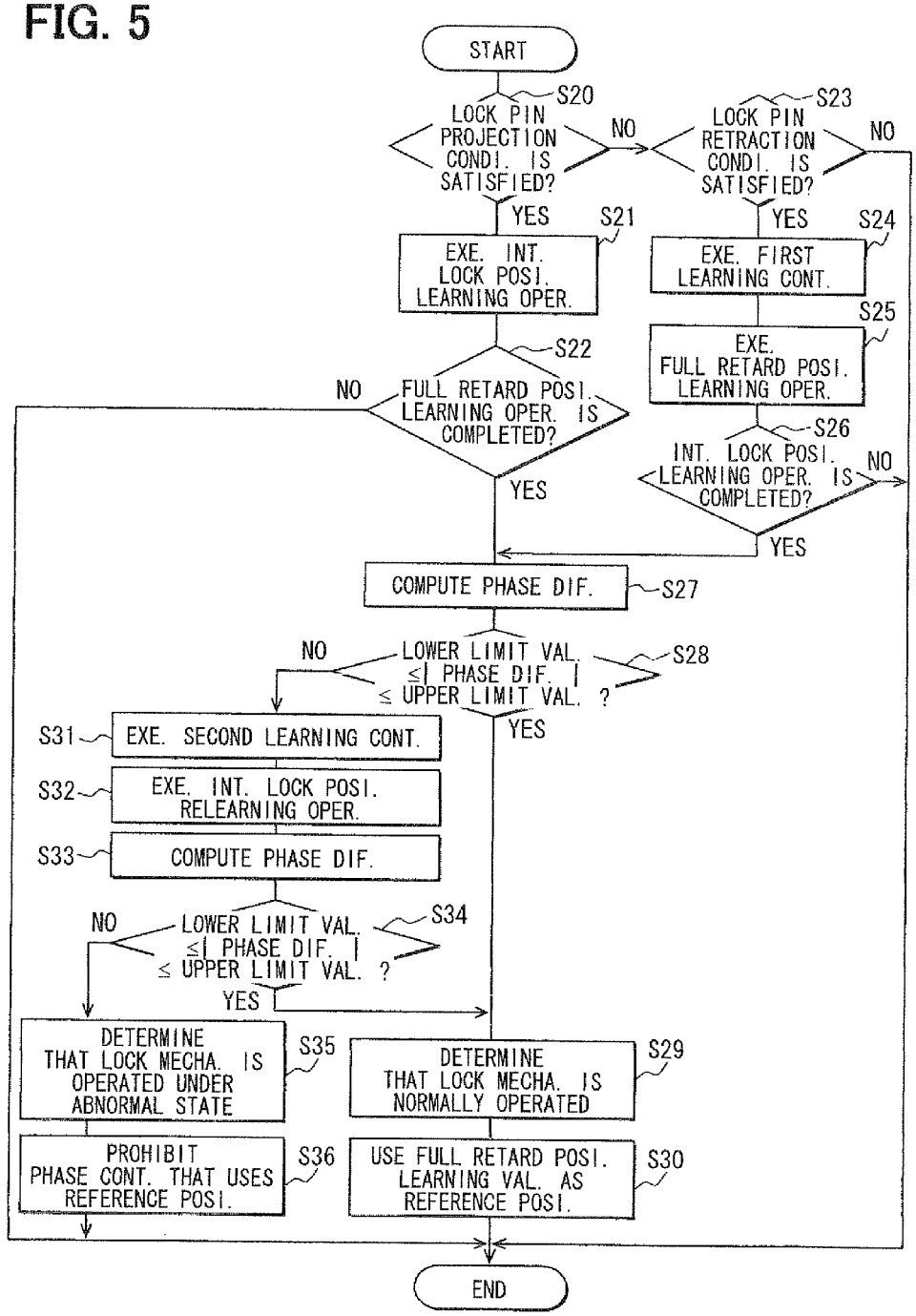
FIG. 5 is a flow chart illustrating a procedure for determining whether the lock mechanism is under an abnormal state according to the first embodiment.

In the present embodiment, the microcomputer 41 repeatedly executes the process shown in FIG. 5 at predetermined intervals in order to determine whether the lock mechanism is operated under the abnormal state, such as the occurrence of the immovable projection abnormality. When it is determined that the lock mechanism is operated under the abnormal state, the feed-back control by using the reference position obtained through the learning operation is prohibited.

In the process of FIG. 5, firstly at step S20, it is determined whether the lock pin projection condition is satisfied. When it is determined that the projection condition is satisfied, corresponding to YES at S20, control proceeds to step S21 (comparison position learning means), where the present phase (a present position of the relative rotational phase) is stored (learned) as a comparison position. When the lock pin 25 is not suffered from the immovable retraction abnormality and is engaged with the lock hole 211, the learned comparison position (intermediate lock position learning value) is supposed to be the lock position or the relative rotational phase at the lock state. Then, control proceeds to step S22, where it is determined whether the full retard position learning operation, which is executed at step S25, is completed. When it is determined that the learning operation of learning the full retard position is completed, corresponding to YES at S22, control proceeds to step S27. When it is determined that the learning operation at step S25 has not been completed, corresponding to NO at S22, the process of FIG. 5 is temporarily stopped, and control returns to step S20. In the determination at step S20, when it is determined that the projection condition is not satisfied, corresponding to NO at S20, control proceeds to step S23, where it is determined whether the lock pin retraction condition is satisfied. When it is determined that the retraction condition is satisfied, corresponding to YES at S23, control proceeds to step S24, where a first learning control is executed, where the phase is forcibly controlled to the full retard position regardless of the present target phase. In the above, the duty of the control electric current supplied to the electromagnetic solenoid 37 is open-loop controlled such that hydraulic oil is supplied to the retard chambers 23. In the above open-loop control, typically, the amount of hydraulic oil supplied to the retard chambers 23 is maximized.

in the subsequent step S25 (reference position learning means), the present phase (a position of the relative rotational phase that has been controlled to the full retard position) is stored (learned) as the reference position when the predetermined time period has elapsed since the start of the execution of the first learning control, or when the relative rotational phase becomes substantially unchanged. For example, the learned reference position (full retard position learning value) is supposed to correspond to the full retard position when the following three conditions (1) to (3) are simultaneously satisfied. Condition (1): the lock pin 25 does not suffer from the immovable projection abnormality. Condition (2): the lock pin 25 is disengaged from the lock hole 211 and is also not limited by the guide groove 212. Condition (3): the limitation pin 26 does not suffer from the immovable projection abnormality, and is not limited by the limitation groove 213. Then, when it is determined at step S21 that the intermediate lock position learning operation has been completed, corresponding to YES at S26, control proceeds to step S27. When it is determined that the learning operation has not been completed, corresponding to NO at S26, the process of FIG. 5 is temporarily ended and control returns to step S20.

It should be noted that the timing of learning the intermediate lock position learning value and the full retard position learning value is not limited to the timing of executing the first learning control at the engine start and after the engine start. For example, the timing of learning the learning values may alternatively correspond to the time, when the target phase is at the full retard position or at the lock position. In general, when a battery voltage becomes equal to or less than a predetermined value, the learning value is reset. The timing of learning the learning values may be performed by executing the process of FIG. 5 when the learning value is reset as above. It should be noted that when the learning value is reset, a predetermined initial value may be used as the learning value, for example.

Also, it may be designed such that when the ignition switch is turned off, the intermediate lock position learning value and the full retard position learning value are reset, and such that when the ignition switch is turned on in the next operation, the learning values are newly learned. Alternatively, even when the ignition switch is turned off, the learning value may remain stored instead.

When the learning values are obtained at steps S21, S25, at the next step S27 (phase difference computing means), the phase difference between the learning values (the full retard position learning value and the intermediate lock position learning value) is computed. Then, control proceeds to step S28, where it is determined whether an absolute value of the computed phase difference is within a predetermined phase difference range. A lower limit value and an upper limit value of the predetermined phase difference range are determined based on a phase difference A1 (see FIG. 4B) in view of a design allowance and a detection error of the actual phase. More specifically, the above phase difference A1 is defined between the full retard position and the lock position, which are obtained in advance in the experiments.

When it is determined that that the phase difference between the learning values is within the predetermined phase difference range, corresponding to YES at S28, control proceeds to step S29, where it is assumed that the immovable projection abnormality and the immovable retraction abnormality do not occur, and thereby that the lock mechanism is normally operated. Then, control proceeds to step S30, where the full retard position learning value learned at step S25 is used as the reference position, and the actual phase is computed based on the detection values of the crank angle sensor 42 and the cam angle sensor 44. In other words, the feed-back control shown in FIG. 2 is executed by using the learned reference position.

In contrast, when it is determined that the phase difference between the learning values falls beyond the predetermined phase difference range, corresponding to NO at S28, it is assumed that one of the immovable projection abnormality and the immovable retraction abnormality may occur. However, it is noted that the phase difference computed at step S27 may fall beyond the predetermined phase difference range even when the above abnormalities do not occur. For example, the phase difference computed at step S27 may fall beyond the predetermined phase difference range when the lock pin 25 fails to be engaged with the lock hole 211, and thereby the lock fails accordingly during the lock control in the proceeding stopping of the engine.

In view of the above, when it is determined NO at step S28, control proceeds to step S31, where a second learning control is executed, in which the phase is forcibly controlled to the lock position (intermediate position) regardless of the present target phase. In the above, the duty of the control electric current supplied to the electromagnetic solenoid 37 is open-loop controlled such that hydraulic oil is supplied to the advance chambers 24. Then, control proceeds to step S32, where the present phase (a position of the relative rotational phase that has been controlled to the lock position) is relearned as the comparison position when a predetermined time period has elapsed since the start of the second learning control, or when the relative rotational phase becomes substantially unchanged. When the lock pin 25 has not erroneously become immovable at any position, the comparison position, which is relearned, is supposed to be the lock position.

Then, control proceeds to step S33, where a phase difference between (a) the full retard position learning value learned at step S25 and (b) the relearning value learned at step S32 is computed. In the next step S34 (abnormality determining means), it is determined whether an absolute value of the phase difference computed at step S33 is within a predetermined phase difference range. The predetermined phase difference range is determined as the range that corresponds to the predetermined phase difference range used in the determination at step S27.

When it is determined that the phase difference based on the relearning value is within the predetermined phase difference range, corresponding to YES at S34, control proceeds to step S29, where it is assumed that the immovable projection abnormality and the immovable retraction abnormality do not occur, and thereby that the lock mechanism is normally operated. Thus, the above process in step S30 is executed.

In contrast, when it is determined that the phase difference based on the relearning value falls beyond the predetermined phase difference range, corresponding to NO at S34, control proceeds to step S35, where it is assumed that the immovable projection abnormality or the immovable retraction abnormality occurs, and thereby that the lock mechanism is operated under the abnormal state. Thus, control proceeds to step S36, where the execution of the feed-back control shown in FIG. 2, which uses the full retard position learning value learned at step S25 as the reference position, is prohibited.

It should be noted that when it is determined at step S35 that the abnormality occurs, it is assumed that a combustion state of the engine becomes unstable because it is impossible to control the relative rotational phase to the desired phase. More specifically, when it is determined at step S35 that the abnormality occurs, it is assumed that misfire may occur during the stand-by operation. Thus, when it is determined at step S35 that the abnormality occurs, diagnosis signals may be outputted. Thus, the engine control needs to be changed in order to avoid the misfire. For example, the target value of the engine rotational speed NE during the stand-by operation may be increased.

In the present embodiment, the lock mechanism is provided to the second rotor, and the lock mechanism includes the lock pin and the lock hole. When the lock pin projection condition is satisfied, the lock pin is displaced from (a) the retraction position, at which the lock pin is retracted within the second rotor, to (b) the projection position, at which the lock pin projects from the second rotor. When the lock pin retraction condition is satisfied, the lock pin is displaced to the retraction position to be retracted within the second rotor. The lock hole is formed to the first rotor, and is engageable with the lock pin that is located at the projection position to lock the relative rotational phase of the first rotor and the second rotor such that the relative rotational phase is unchanged. The predetermined phase difference range used in step S28 is determined in advance based on a phase difference between (a) the position of the relative rotational phase that is locked by the engagement of the lock pin with the lock hole and (b) the full retard position of the relative rotational phase that is unlocked.

In the above lock mechanism, in a case of the abnormal state, where the lock mechanism is incapable of releasing the lock due to the lock pin that is immovable at the projection position, even when the full retard position is attempted to be learned as the comparison position or as the reference position, the intermediate position (lock position) would be learned erroneously instead. As a result, the computed phase difference would be lower than the lower limit value of the predetermined phase difference range. Also, in another case of the abnormal state, where the lock mechanism is incapable of locking due to the lock pin that is immovable at the retraction position, even when the lock position is attempted to be learned as the comparison position or as the reference position, a position of the relative rotational phase that is different from the lock position would be erroneously learned. As a result, the computed phase difference would fall beyond or out of the predetermined phase difference range.

Thus, in the present embodiment, the predetermined phase difference range used in the determination of the abnormality is defined in advance based on the phase difference between (a) the position of the relative rotational phase that is locked by the engagement of the lock pin with the lock hole and (b) the full retard position of the relative rotational phase that is unlocked. As a result, it is possible to accurately determined whether the lock mechanism is under the abnormal state.

According to the present embodiment, when at least one of the lock pin 25 and the limitation pin 26 is under the lock immovable state, where the lock pin 25 or 26 is located temporarily immovable at the lock position, the phase difference computed at step S34 is supposed to be lower than the lower limit value of the predetermined phase difference range. Also, when the lock pin 25 is under the retraction immovable state, where the lock pin 25 is temporarily immovable at the retraction position, the phase difference computed at step S34 is supposed to fall beyond the predetermined phase difference range. According to the present embodiment, which is made in view of the above, when the phase difference falls beyond the predetermined phase difference range, it is determined that the operation is under the abnormal state. As a result, it is possible to accurately determine whether the lock mechanism is operated under the abnormal state. Also, when it is determined that the lock mechanism is operated under the abnormal state, the execution of phase control using the reference position is prohibited. As a result, it is possible to avoid the execution of the feed-back control of the VVT 20 using the erroneously learned reference position.

In an example case, where the hydraulic oil has high viscosity due to the low temperature thereof, the lock pin may not be successfully engaged with the lock hole when the lock control is executed. In the above lock failure case, if the phase (or the position of the relative rotational phase) at a time of starting the engine in the next operation is learned as the intermediate position (lock position), the wrong position would be erroneously learned as the intermediate position. Thus, if the phase after the execution of the first learning control is learned as the full retard position, and further if the phase difference is computed based on the above erroneous learning value, the phase difference would fall beyond the predetermined phase difference range. As above, even in a case, where the lock pin is movable, the computed phase difference may be determined to fall beyond the predetermined phase difference range, and thereby it would be determined that the abnormal state occurs erroneously.

Furthermore, according to the present embodiment, in the determination of whether the operation is under the abnormal state based on whether the phase difference falls within the predetermined phase difference range, when the first determination result at step S28 indicates that the phase difference falls beyond the predetermined phase difference range, the second learning control is executed at S31 such that the phase is open-loop controlled to the lock position. Then, the phase after the execution of the second learning control is relearned as the lock position (comparison position), and then it is determined at S34 whether the phase difference based on the relearned value of the phase falls within the predetermined phase difference range. As a result, even in a case, where the first determination result erroneously indicates that the phase difference falls beyond the predetermined phase difference range due to the lock failure of the lock control executed in the proceeding stopping of the engine, it is possible to accurately determine that the phase difference is within the predetermined phase difference range in the second determination at S34 if the immovable abnormality has not occurred. Thus, it is possible to avoid the erroneous determination of the abnormal state caused by the lock failure, and thereby it is possible to improve the accuracy of the determination.

Second Embodiment

Figure 6A:
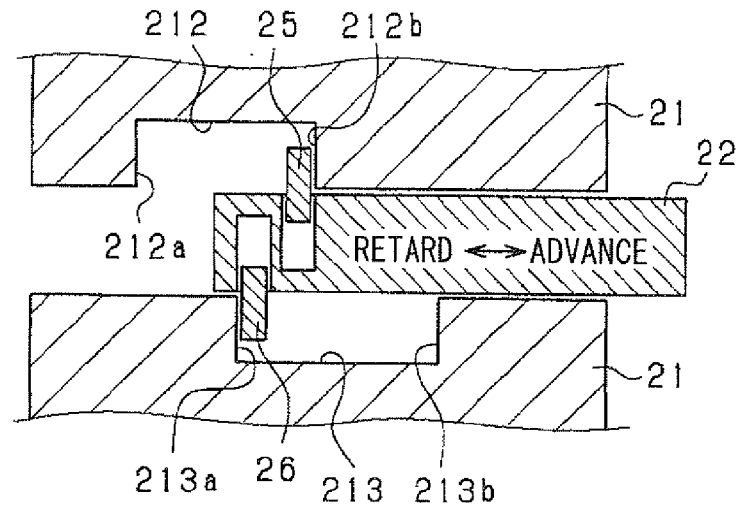
FIG. 6A a schematic diagram illustrating a lock state according to the second embodiment of the present invention.
Figure 6B:
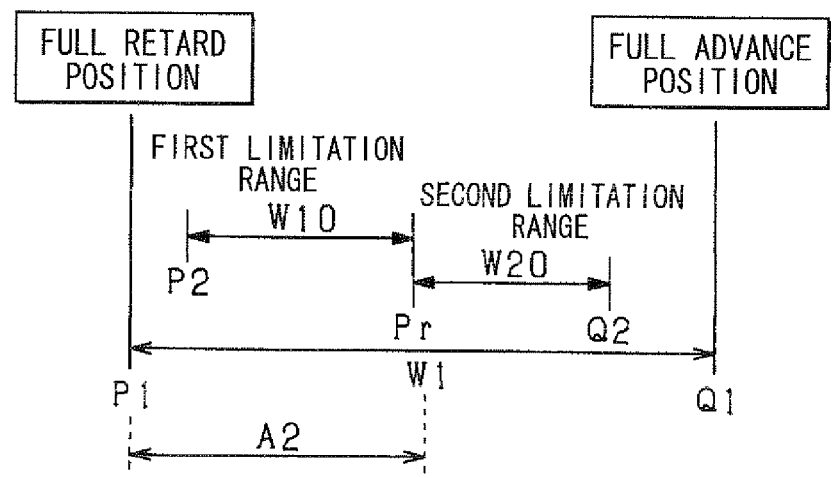
FIG. 6B is a diagram illustrating a relation between a first limitation range and a second limitation range according to the second embodiment.

In the present embodiment shown in FIG. 6, the lock hole 211 of the first embodiment is removed (see FIG. 6A). Instead, the first limitation range W10 defined by a first limitation groove 212 (corresponding to the guide groove 212 in the first embodiment) and the second limitation range W20 defined by a second limitation groove 213 (corresponding to the limitation groove 213 in the first embodiment) are provided as shown in FIG. 6B. Other hardware configuration in the second embodiment is similar to that in the first embodiment.

The first limitation range W10 is different from the second limitation range W20 and does not overlap with the second limitation range W20. The advance-end wall surface 212b of the first limitation groove 212 limits the displacement of a first limitation pin 25 (corresponding to the lock pin 25) in the advance direction, and simultaneously the retard-end wall surface 213a of the second limitation groove 213 limits the displacement of a second limitation pin 26 (corresponding to the limitation pin 26) in the retard direction. In the present embodiment, the both limitation ranges W10, W20 are designed such that the advance-end wall surface 212b and the retard-end wall surface 213a limit the displacement of the corresponding pin 25, 26 simultaneously for preventing the displacement of the relative rotational phase in the advance direction and in the retard direction. As a result, without having the lock hole 211, it is possible to lock the rotors 21, 22 such the rotor 21 is limited from rotating relative to the rotor 22.

In the present embodiment, the processes similar to those in FIGS. 2 and 5 are executed. It should be noted that the lower limit value and the upper limit value of the predetermined phase difference range used insteps S28, S34 in FIG. 5 are determined based on a phase difference A2 (see FIG. 6B) in view of the design allowance and the detection error of the actual phase. In the above, the phase difference A2 shown in FIG. 6B is defined between the full retard position and the phase (lock position), at which the displacement of the phase is limited by the engagement of the limitation pins 25, 26 with the respective limitation grooves 212, 213. The above full retard position and the lock position are obtained in advance in the experiments. The advantages of the first embodiment are also achievable in the present embodiment.

Third Embodiment

In the present embodiment, it is determined whether the camshaft 14 is erroneously assembled based on (a) the intermediate lock position learning value learned or relearned in the first embodiment and (b) the full retard position learning value. In other words, in the assembly of the camshaft 14 to the engine, it is required that the camshaft 14 is located at a predetermined rotational position relative to the rotational position of the crankshaft 10. Thus, in the present embodiment, it is determined whether the camshaft 14 is erroneously assembled at an erroneous position different from the predetermined rotational position. It should be noted that a valve timing adjusting unit of the present embodiment has a hardware configuration that is similar to that in the first or second embodiment. In the present embodiment, the processes similar to those in FIGS. 2 and 5 are executed, and processes in FIGS. 7A and 7B are executed in order to determine the erroneous assembly.

In step S40 of FIG. 7A (abnormality determining means), it is determined whether the absolute value of the full retard position learning value learned at step S25 of FIG. 5 is within a predetermined second range. The lower limit value and the upper limit value of the second range is determined based on the design allowance and the detection error of the actual phase. When it is determined that the absolute value of the full retard position learning value is within the second range, corresponding to YES at S40, control proceeds to step S42, where it is determined that the assembly of the camshaft 14 is normal. When it is determined that the absolute value falls beyond the second range, corresponding to NO at S40, control proceeds to step S43, where it is determined that the abnormal state occurs, where the camshaft 14 is erroneously assembled. It should be noted that the lower limit value of the second range is smaller than the lower limit value of the first range at step S34 in FIG. 5, and the upper limit value of the second range is greater than the upper limit value of the first range, for example.

Also, in step S41 of FIG. 7B (abnormality determining means), it is determined whether the absolute value of the intermediate lock position learning value learned or relearned at steps S21, S32 in FIG. 5 is within a predetermined third range. The lower limit value and the upper limit value of the third range is determined based on the design allowance and the detection error of the actual phase. When it is determined that the absolute value is within the third range, corresponding to YES at S41, control proceeds to step S42, where it is determined that the camshaft 14 is normally assembled.

When it is determined that the absolute value is beyond the third range, corresponding to NO at S41, control proceeds to step S43, where the abnormal state occurs, where the camshaft 14 is erroneously assembled.

It should be noted that only one of the processes in FIGS. 7A and 7B may be executed. Also, in a case, where both of the processes in FIGS. 7A and 7B are executed, it is determined that the camshaft 14 is normally assembled when the determination results in both of steps S40. S41 are "YES". In contrast, it is determined that the camshaft 14 is erroneously assembled when at least one of the determination results in both of steps S40, S41 is "NO".

Fourth Embodiment

A hardware configuration of the VVT 20 of the present embodiment is similar to the configuration shown in FIG. 4. In the first embodiment, the abnormal state of the lock mechanism caused by the immovable abnormality is determined based on the phase difference between (a) the intermediate lock position learning value and (b) the full retard position learning value. In contrast, in the present embodiment, it is determined that the lock mechanism is under the abnormal state if the relative rotational phase is not shifted from the intermediate position (lock position) as required while the lock pin retraction condition is satisfied. In the above case, because it is reasonably assumed that the lock pin 25 has the immovable projection abnormality, it is determined that the lock mechanism is under the abnormal state. Also, it is assumed that the lock pin 25 has the immovable projection abnormality if the relative rotational phase is not shifted from the first limitation range W1 as required while the lock pin retraction condition is satisfied. It is also assumed that the limitation pin 26 has the immovable projection abnormality if the relative rotational phase is not shifted from the second limitation range W2 as required in the above case. Thus, it is determined that the lock mechanism is under the abnormal state when either of the pins 25, 26 have the immovable projection abnormality.

Also, when the relative rotational phase is shifted from the intermediate position (lock position) while the lock pin projection condition is satisfied, it is assumed that the lock pin 25 has the immovable retraction abnormality, and thereby it is determined that the lock mechanism is under the abnormal state. Also, when the relative rotational phase is shifted from the first limitation range W1 while the lock pin projection condition is satisfied, it is also assumed that the lock pin 25 has the immovable retraction abnormality, and thereby it is determined that the lock mechanism is under the abnormal state. Also, when the relative rotational phase is shifted from the second limitation range W2 as required while the lock pin projection condition is satisfied, it is assumed that the limitation pin 26 has the immovable retraction abnormality, and thereby it is determined that the lock mechanism is under the abnormal state.

Figure 8:
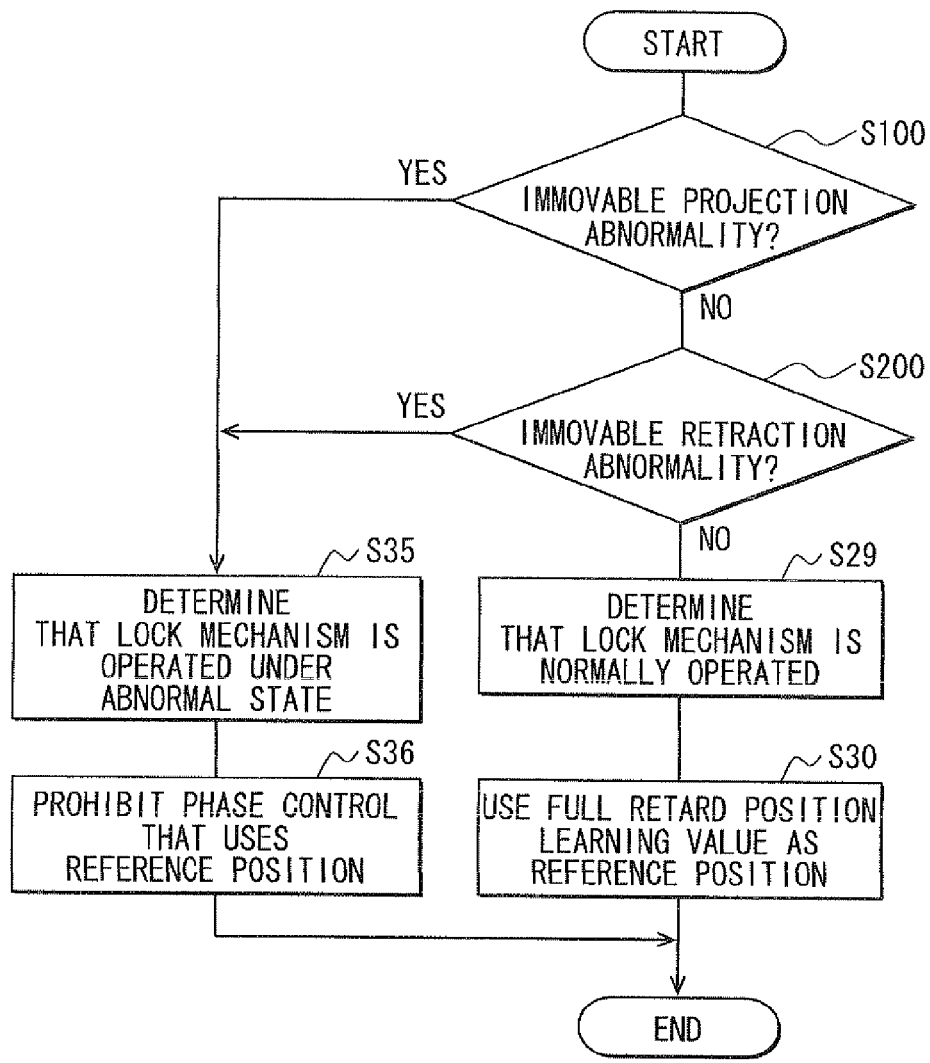
FIG. 8 is a flow chart illustrating a procedure for determining whether the lock mechanism is under the abnormal state according to the fourth embodiment of the present invention.
Figure 9:
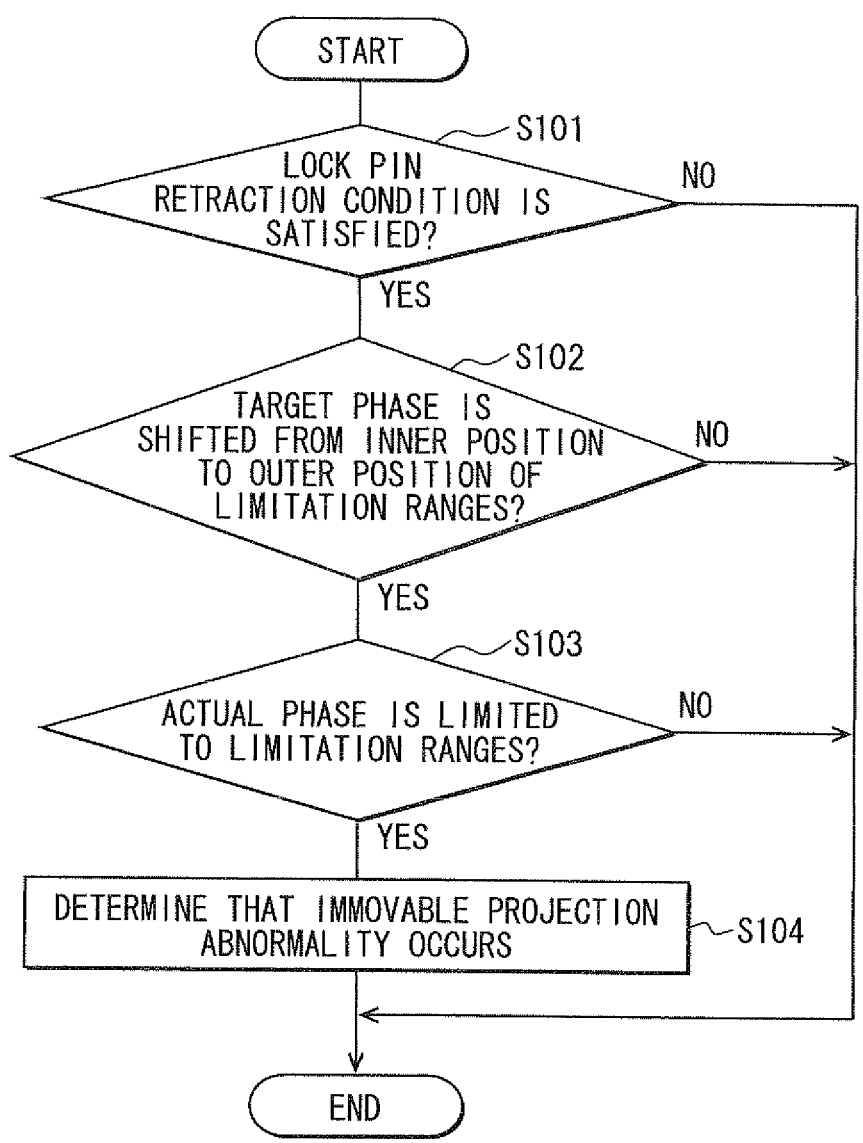
FIG. 9 is a flow chart illustrating a subroutine process of the process in FIG. 8.
Figure 10:
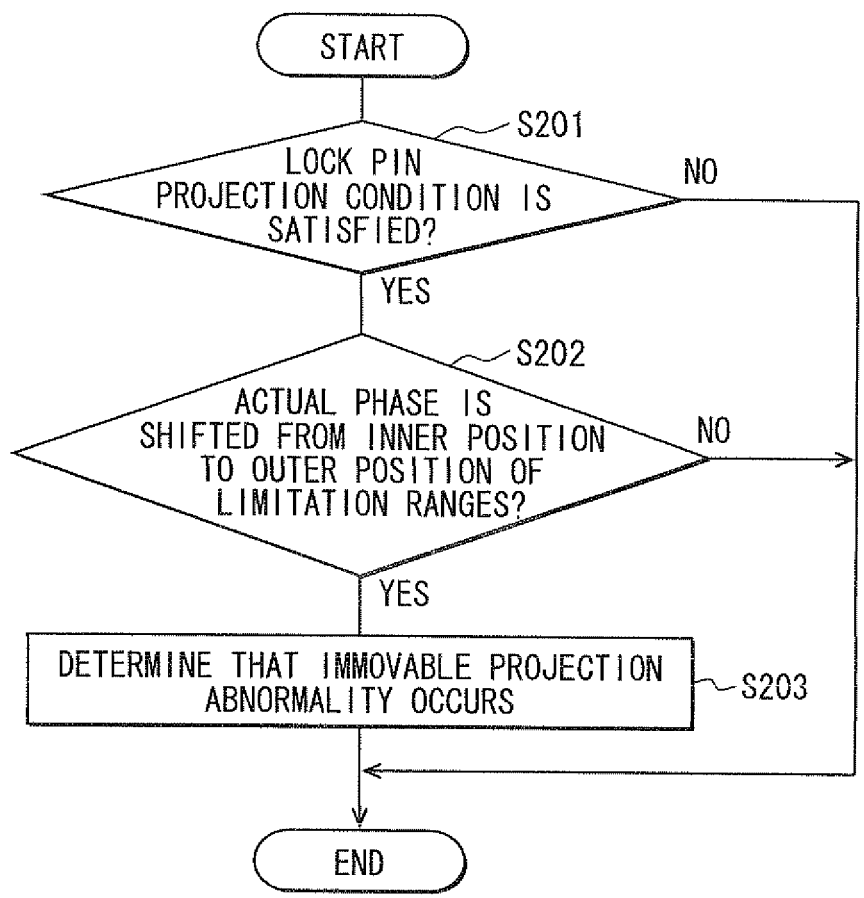
FIG. 10 is a flow chart illustrating another subroutine process of the process in FIG. 8.

FIG. 8 is a main routine illustrating a procedure of determining the abnormality of the lock mechanism in the present embodiment, and FIG. 9 and FIG. 10 are subroutines of FIG. 8. The processes of FIGS. 8 to 10 are repeatedly executed at predetermined intervals.

Firstly, in step S100 of FIG. 8 (abnormality determining means), it is determined whether at least one of the lock pin 25 and the limitation pin 26 has the immovable projection abnormality by executing the process in FIG. 9. Then, control proceeds to step S200 (abnormality determining means), where it is determined whether at least one of the lock pin 25 and the limitation pin 26 has the immovable retraction abnormality by executing the process in FIG. 10.

When it is determined that the pins 25, 26 do not have the immovable abnormality, corresponding to NO at S100 and NO at S200, control proceeds to step S29, where it is determined that the lock mechanism is in the normal state. Then, control proceeds to step S30, where the full retard position learning value is used as the reference position, and the actual phase is computed based on the detection values of the crank angle sensor 42 and the cam angle sensor 44. In other words, the feed-back control shown in FIG. 2 is executed by using the learned reference position. It should be noted that the procedure of learning the full retard position learning value is similar to steps S21, S23, S24 in FIG. 5 and is executed independently of the process in FIG. 8.

When the immovable projection abnormality or the immovable retraction abnormality is determined, corresponding to YES at S100 or YES at S200, control proceeds to step S35, where it is determined that the lock mechanism is under the abnormal state. Then, control proceeds to step S36, where the execution of the feed-back control shown in FIG. 2 using the full retard position learning value learned at step S25 as the reference position is prohibited.

It should be noted that when it is determined at step S35 that the abnormality occurs, the combustion state of the engine may become unstable because it is impossible to control the relative rotational phase to the desired phase. Specifically, during the stand-by operation, the misfire may occur. Thus, when it is determined at step S35 that the abnormality occurs, diagnosis signal is outputted such that the engine control state is changed in order to avoid the misfire. For example, the target value of the engine rotational speed NE during the stand-by operation may be increased.

FIG. 9 is a subroutine process of step S100, and it is determined at step S101 whether the retraction condition of the lock pin 25 is satisfied. Then, control proceeds to step S102, where it is determined whether the target phase is shifted from a position within the limitation ranges W1, W2 to a position out of the limitation ranges W1, W2. Then, control proceeds to step S103, where it is determined whether the actual phase of the VVT 20 is limited to the limitation ranges W1, W2. For example, when the actual phase has stayed within the limitation ranges W1. W2 for equal to or greater than a predetermined time period, it is determined that the actual phase of the VVT 20 is limited to the limitation ranges W1, W2, corresponding to YES at step S103. Then, when the determination results at steps S101 to S103 are all YES, control proceeds to step S104, where it is assumed that at least one of the lock pin 25 and the limitation pin 26 has the immovable projection abnormality, and thereby it is determined that the lock mechanism is under the abnormal state.

Alternatively, it may be determined at step S102 whether the target phase is shifted from the lock position. Subsequently, it may be determined at step S103 whether the actual phase is limited (locked) to the lock position. In the above alternative case, when the determination result at steps S101 to S103 are all YES, it is assumed that the lock pin 25 has the immovable projection abnormality, and thereby the abnormality is determined at step S104.

FIG. 10 is a subroutine process of step S200. Firstly, it is determined at step S201 whether the projection condition of the lock pin 25 is satisfied. Then, control proceeds to step S202, where it is determined whether the actual phase of the VVT 20 is shifted from a position within the limitation ranges W1, W2 to a position out of the limitation ranges W1, W2. When the determination results at steps S201, S202 are all YES, control proceeds to step S203, where it is assumed that both of the lock pin 25 and the limitation pin 26 have the immovable retraction abnormality, and thereby it is determined that the lock mechanism is under the abnormal state.

Alternatively, it may be determined at step S202 whether the actual phase is shifted from the lock position. In the alternative case, when all of the determination results are YES at steps S201, S202, it is assumed that the lock pin 25 have the immovable retraction abnormality, and thereby the abnormality is determined at step S203.

According to the present embodiment, when the phase is shifted from a position within the limitation ranges W1, W2 to a position out of the limitation ranges W1, W2 even though the projection condition is satisfied, it is determined that the immovable retraction abnormality occurs. Alternatively, when the phase is shifted from the lock position even though the projection condition is satisfied, it is determined that the immovable retraction abnormality occurs. Also, when the phase is not shifted as required from the position within the limitation ranges W1, W2 to the position out of the limitation ranges W1, W2 even though the retraction condition is satisfied, it is determined that the immovable projection abnormality occurs. Alternatively, when the phase is not shifted as required from the lock position even though the retraction condition is satisfied, it is determined that the immovable retraction abnormality occurs. As a result, it is possible to accurately determine whether the lock mechanism is under the abnormal state. Accordingly, when it is determined that the lock mechanism is under the abnormal state, the execution of the phase control using the reference position is prohibited. Thus, it is possible to avoid the execution of the feed-back control of the VVT 20 by using the erroneously-learned reference position.

Other Embodiment

The present invention is not limited to the above embodiments, and may be modified as below. Also, characteristic configuration of each of the above embodiments may be combined with each other as required.

The present invention may be alternatively applicable to the VVT 20 that is not provided with the limitation groove 213 of the first embodiment. Also, the present invention is applicable to the VVT 20 that is not provided with the guide groove 212 of the first embodiment.

The present invention may be alternatively applicable to a VVT 20 of the fourth embodiment, which is not provided with the limitation groove 213. In the above case, it is determined at step S102 whether the target phase is shifted from the position within the first limitation range W1 to the position out of the first limitation range W1. Then, it is determined at step S103 whether the actual phase is limited to the first limitation range W1. Then, it is determined at step S202 whether the actual phase is shifted from the position within the first limitation range W1 to the position out of the first limitation range W1.

The present invention may be alternatively applicable to the VVT 20 of the fourth embodiment, which is alternatively not provided with the guide groove 212. In the above case, it is determined at step S102 whether the target phase is shifted from the position within the second limitation range W2 to the position out of the second limitation range W2, and then it is determined at step S103 whether the actual phase is limited to the second limitation range W2. Then, it is determined step S202 whether the actual phase is shifted from the position within the second limitation range W2 to the position out of the second limitation range W2.

The present invention may be alternatively applicable to the VVT 20 of the fourth embodiment, which is alternatively not provided with the guide groove 212 and the limitation groove 213. Also, the present invention may be alternatively applicable to the VVT 20 shown in FIG. 6 instead of the VVT 20 shown in FIG. 4. In the above case, it is determined at step S102 whether the target phase is shifted from the lock position, and then it is determined at step S103 whether the actual phase is limited to the range of the lock position. Then, it is determined at step S202 whether the actual phase is shifted from the lock position.

In the fourth embodiment, the immovable projection abnormality is determined at step S100, and the immovable retraction abnormality is also determined at step S200. When at least one of the immovable abnormality is determined, the execution of the phase control using the full retard position learning value as the reference position is prohibited. An alternative case will be described below. When the immovable "projection" abnormality is determined, the execution of the phase control is prohibited similar to the above. However, when the immovable "retraction" abnormality is determined, the execution of the phase control may be allowed. In a further alternative case, the determination of the immovable retraction abnormality at step S200 may be removed. The above alternative cases may be made because the full retard position is not erroneously learned even when the immovable retraction abnormality occurs.

In each of the above embodiments, the phase, which is controlled by the VVT 20 to the full retard position, is learned as the reference position, and the phase (lock position) at the engine start is learned as the comparison position. In contrast, the phase (lock position) at the engine start may be learned as the reference position, and the phase, which is controlled by the VVT 20 to the full retard position, may be learned as the comparison position.

In the first and fourth embodiments, the lock hole 211 is located at an advance end position of the guide groove 212. However, the lock hole 211 may be alternatively located at a retard end position of the guide groove 212.

At step S103 in FIG. 9, it may be alternatively determined whether the phase is shifted in the advance direction or in the retard direction from (a) a specific position, which is located within the first limitation range W1 and which is located out of the second limitation range W2, to (b) the position out of the first limitation range W1. Due to the above, it is possible to effectively remove the influence of the immovable projection abnormality of the limitation pin 26 in the determination of the immovable projection abnormality of the lock pin 25. More specifically, it is possible to effectively remove the influence of a certain state, where the limitation pin 26 has the immovable projection abnormality such that the shift of the phase is erroneously limited to the second limitation range W2 while the retraction condition is satisfied. As a result, it is possible to effectively determine whether the lock pin 25 has the immovable projection abnormality without the influence of the immovable projection abnormality of the limitation pin 26. As above, it is possible to accurately determine whether one of the pins 25, 26 has the immovable projection abnormality.

At step S103 in FIG. 9, it may be alternatively determined whether the phase is shifted in the advance direction or in the retard direction from (a) the other specific position, which is located within the second limitation range W2, and which is located out of the first limitation range W1, to (b) the position out of the second limitation range W2. Due to the above, it is possible to effectively remove the influence of the immovable projection abnormality of the lock pin 25 in the determination of the immovable projection abnormality of the limitation pin 26. More specifically, it is possible to remove the influence of a certain state, where the lock pin 25 has the immovable projection abnormality such that the shift of the phase is erroneously limited to the first limitation range W1 while the retraction condition is satisfied. As a result, it is possible to determine whether the limitation pin 26 has the immovable projection abnormality without the influence of the immovable projection abnormality of the lock pin 25. As above, it is possible to accurately determine whether one of the pins 25, 26 has the immovable projection abnormality.

At step S202 in FIG. 10, it may be alternatively determined whether the phase has been shifted in the advance direction or in the retard direction from (a) a certain position, which is located out of the second limitation range W2, and which is located within the first limitation range W1, to (b) the position out of the first limitation range W1. Due to the above, it is possible to effectively remove the influence of the immovable retraction abnormality of the limitation pin 26 in the determination of the immovable retraction abnormality of the lock pin 25. More specifically, it is possible to effectively remove the influence of a certain state, where the limitation pin 26 has the immovable retraction abnormality such that the shift of the phase is erroneously not limited to the second limitation range W2 while the projection condition is satisfied. As a result, it is possible to effectively determine whether the lock pin 25 has the immovable retraction abnormality without the influence of the immovable retraction abnormality of the limitation pin 26. As above, it is possible to accurately determine whether one of the pins 25, 26 has the immovable retraction abnormality.

At step S202 in FIG. 10, it may be alternatively determined whether the phase has been shifted in the advance direction or in the retard direction from (a) a certain position, which is located out of the first limitation range W1, and which is located within the second limitation range W2, to (b) the position located out of the second limitation range W2. Due to the above, it is possible to effectively remove the influence of the immovable retraction abnormality of the lock pin 25 in the determination of the immovable retraction abnormality of the limitation pin 26. More specifically, it is possible to effectively remove the influence of a certain state, where the lock pin 25 has the immovable retraction abnormality such that the shift of the phase is erroneously not limited to the first limitation range W1 while the projection condition is satisfied. As above, it is possible to accurately determine whether one of the pins 25, 26 has the immovable retraction abnormality.

Additional advantages and modifications will readily occur to those skilled in the art. The invention in its broader terms is therefore not limited to the specific details, representative apparatus, and illustrative examples shown and described.

What is claimed is:

1. A valve timing control apparatus for a valve timing adjusting unit that adjusts valve timing of opening and closing one of an intake valve and an exhaust valve of an engine having a camshaft and an output shaft, wherein the camshaft opens and closes the one of the intake valve and the exhaust valve, wherein the valve timing adjusting unit includes:
   a first rotor that is rotatable synchronously with one of the camshaft and the output shaft;
   a second rotor that is rotatable synchronously with the other one of the camshaft and the output shaft;
   a hydraulic actuator that changes a relative rotational phase between the first rotor and the second rotor; and
   a lock mechanism that is configured to lock the relative rotational phase at an intermediate position located between a full retard position and a full advance position such that the relative rotational phase is unchanged, wherein the valve timing adjusting unit adjusts the valve timing by controlling the hydraulic actuator to perform a phase control for controlling the relative rotational phase, the valve timing control apparatus comprising:
   reference position learning means for learning, as a reference position, one of:
      (a) a first position of the relative rotational phase that is controlled through the phase control at control at the full retard position; and
      (b) a second position of the relative rotation phase that is locked by the lock mechanism at the intermediate position;
   actual phase computing means for computing an actual phase based on the learned reference position;
   target phase computing means for computing a target phase based on an operational state of the engine;
   feed-back controlling means for controlling the hydraulic actuator to perform the phase control based on a difference between the target phase and the actual phase; and
   abnormality determining means for determining whether the lock mechanism is under an abnormal state, wherein:
   when the abnormality determining means determines that the lock mechanism is under the abnormal state, the feed-back controlling means is prohibited from performing the phase control that uses the reference position,
   the other one of the first and second positions is a comparison position, the valve timing control apparatus further comprising:
      comparison position learning means for learning the comparison position; and
      phase difference computing means for computing a phase difference between (a) the comparison position learned by the comparison position learning means and (b) the reference position learned by the reference position learning means, wherein:
   the abnormality determining means determines that the lock mechanism is under the abnormal state when the phase difference falls beyond a predetermined phase difference range.

2. The valve timing control apparatus according to claim 1, wherein:
   the lock mechanism includes:
      a lock pin that is provided to the second rotor, the lock pin being displaced from a retraction position, at which the lock pin is retracted within the second rotor, to a projection position, at which the lock pin projects from the second rotor, when a lock pin projection condition is satisfied, the lock pin being displace to the retraction position when a lock pin retraction condition is satisfied; and
      a lock hole is formed at the first rotor, the lock hole being engageable with the lock pin that is located at the projection position in order to lock the relative rotational phase such that the relative rotational phase of the first rotor and the second rotor is unchanged; and
   the predetermined phase difference range is determined in advance based on a phase difference defined between (a) a position of the relative rotational phase that is locked by the engagement of the lock pin with the lock hole and (b) a full retard position of the relative rotational phase that is unlocked.

3. The valve timing control apparatus according to claim 1, wherein:
the lock mechanism includes:
a first limitation pin and a second limitation pin that are provided to the second rotor, each of the first and second limitation pins being displaced from (a) a corresponding retraction position, at which each of the first and second limitation pins is retracted within the second rotor, to (b) a corresponding projection position, at which each of the first and second limitation pins projects from the second rotor, when a projection condition is satisfied, each of the first and second limitation pins being displaced to the corresponding retraction position when a retraction condition is satisfied; and
a first limitation groove that is formed to the first rotor, the first limitation groove limiting a displacement range of the first limitation pin that is located at the corresponding projection position such that the first limitation pin is displaceable within a first limitation range;
a second limitation groove that is formed to the first rotor, the second limitation groove limiting a displacement range of the second limitation pin that is located at the corresponding projection position such that the second limitation pin is displaceable within a second limitation range that is different from the first limitation range;
the first limitation range and the second limitation range are designed to lock the relative rotation of the first rotor and the second rotor when the followings are simultaneously satisfied:
the displacement of the first limitation pin is limited to the first limitation range; and
the displacement of the second limitation pin is limited to the second limitation range; and
the predetermined phase difference range is determined in advance based on a phase difference between (a) a position of the relative rotational phase that is locked by the limited displacement of the first limitation pin and the second limitation pin and (b) a full retard position of the relative rotational phase that is unlocked.

4. The valve timing control apparatus according to claim 1, wherein:
one of the reference position learning means and the comparison position learning means learns a position of the relative rotational phase at a time of starting the engine as the second position;
the one of the reference position learning means and the comparison position learning means executes a first learning control for forcibly control the relative rotational phase to the full retard position regardless of the target phase after the position at the time of starting the engine is learned;
the other one of the reference position learning means and the comparison position learning means learn a position of the relative rotational phase after the first learning control is executed;
the other one of the reference position learning means and the comparison position learning means executes a second learning control for forcibly controlling the relative rotational phase to a lock position for the lock mechanism regardless of the target phase after the first learning control is executed when the phase difference computed by the phase difference computing means based on the position at the time of starting the engine falls beyond the predetermined phase difference range;
the other one of the reference position learning means and the comparison position learning means relearns a position of the relative rotational phase after the second learning control is executed;
the abnormality determining means determines that the lock mechanism is under the abnormal state when the phase difference computed by the phase difference computing means based on the relearned position falls beyond the predetermined phase difference range.

5. The valve timing control apparatus according to claim 1, wherein:
the lock mechanism includes:
a lock pin that is provided to the second rotor, the lock pin being displaced from a retraction position, at which the lock pin is retracted within the second rotor, to a projection position, at which the lock pin projects from the second rotor, when a lock pin projection condition is satisfied, the lock pin being displace to the retraction position when a lock pin retraction condition is satisfied;
a lock hole is formed at the first rotor, the lock hole being engageable with the lock pin that is located at the projection position in order to lock the relative rotational phase such that the relative rotational phase of the first rotor and the second rotor is unchanged;
a limitation pin that is provided to the second rotor, the limitation pin being displaced from (a) a retraction position, at which the limitation pin is retracted within the second rotor, to (b) a projection position, at which the limitation pin projects from the second rotor, when a limitation pin projection condition is satisfied, the limitation pin being displaced to the retraction position when a limitation pin retraction condition is satisfied;
a limitation groove that is provided to the first rotor, the limitation groove limiting a displacement range of the limitation pin that is located at the projection position such that the limitation pin is displaceable within a predetermined second limitation range that includes a lock position defined by the lock hole; and
the abnormality determining means determines that the lock mechanism is under the abnormal state when the relative rotational phase has not been shifted from an inner position within the second limitation range to an outer position out of the second limitation range while the limitation pin retraction condition is satisfied.

6. The valve timing control apparatus according to claim 1, wherein:
the lock mechanism includes:
a first limitation pin and a second limitation pin that are provided to the second rotor, each of the first and second limitation pins being displaced from (a) a corresponding retraction position, at which each of the first and second limitation pins is retracted within the second rotor, to (b) a corresponding projection position, at which each of the first and second limitation pins projects from the second rotor, when a projection condition is satisfied, each of the first and second limitation pins being displaced to the corresponding retraction position when a retraction condition is satisfied;
a first limitation groove that is formed to the first rotor, the first limitation groove limiting a displacement range of the first limitation pin that is located at the corresponding projection position such that the first limitation pin is displaceable within a first limitation range; and a second limitation groove that is formed to the first rotor, the second limitation groove limiting a displacement range of the second limitation pin that is located at the corresponding projection position such that the second limitation pin is displaceable within a second limitation range that is different from the first limitation range;

the first limitation range and the second limitation range are designed to lock the relative rotation of the first rotor and the second rotor when the followings are simultaneously satisfied:
  the displacement of the first limitation pin is limited to the first limitation range; and
  the displacement of the second limitation pin is limited to the second limitation range; and
the abnormality determining means determines that the lock mechanism is under the abnormal state when one of the followings is satisfied while the retraction condition is satisfied:
  the relative rotational phase has not been shifted from an inner position, which is located within the first limitation range and within the second limitation range, to an outer position, which is located out of the first limitation range and within the second limitation range; and
  the relative rotational phase has not been shifted from the intermediate position.

7. A valve timing control apparatus for a valve timing adjusting unit that adjusts valve timing of opening and closing one of an intake valve and an exhaust valve of an engine having a camshaft and an output shaft, wherein the camshaft opens and closes the one of the intake valve and the exhaust valve, wherein the valve timing adjusting unit includes:
  a first rotor that is rotatable synchronously with one of the camshaft and the output shaft;
  a second rotor that is rotatable synchronously with the other one of the camshaft and the output shaft,
  a hydraulic actuator that changes a relative rotational phase between the first rotor and the second rotor; and
  a lock mechanism that is configured to lock the relative rotational phase at an intermediate position located between a full retard position and a full advance position such that the relative rotational phase is unchanged, wherein the valve timing adjusting unit adjusts the valve timing by controlling the hydraulic actuator to perform a phase control for controlling the relative rotational phase, the valve timing control apparatus comprising:
  reference position learning means for learning, as a reference position, one of:
    (a) a first position of the relative rotational phase that is controlled through the phase control at control at the full retard position; and
    (b) a second position of the relative rotation phase that is locked by the lock mechanism at the intermediate position;
  actual phase computing means for computing an actual phase based on the learned reference position;
  target phase computing means for computing a target phase based on an operational state of the engine;
  feed-back controlling means for controlling the hydraulic actuator to perform the phase control based on a difference between the target phase and the actual phase; and
  abnormality determining means for determining whether the lock mechanism is under an abnormal state, wherein:
  when the abnormality determining means determines that the lock mechanism is under the abnormal state, the feed-back controlling means is prohibited from performing the phase control that uses the reference position,
  the lock mechanism includes:
    a lock pin that is provided of the second rotor, the lock pin being displaced from a retraction position, at which the lock pin is retracted within the second rotor, to a projection position, at which the lock pin projects from the second rotor, when a lock pin projection condition is satisfied, the lock pin being displace to the retraction position when a lock pin retration condition is satisfied; and
    a lock hole is formed at the first rotor, the lock hole being engageable with the lock pin that is located at the projection position in order to lock the relative rotational phase such that the relative rotational phase of the first rotor and the second rotor is unchanged; and
  the abnormality determining means determines that the lock mechanism is under the abnormal state when the phase difference falls beyond a predetermined phase difference range position while the lock pin retraction condition is satisfied;
  the first position serves as the reference position; and
  the feed-back controlling means is allowed to perform the phase control using the reference position when the relative rotational phase has been shifted from the intermediate position while the lock pin projection condition is satisfied.

8. A valve timing control apparatus for a valve timing adjusting unit that adjusts valve timing of opening and closing one of an intake valve and an exhaust valve of an engine having a camshaft and an output shaft, wherein the camshaft opens and closes the one of the intake valve and the exhaust valve, wherein the valve timing adjusting unit includes:
  a first rotor that is rotatable synchronously with one of the camshaft and the output shaft;
  a second rotor that is rotatable synchronously with the other one of the camshaft and the output shaft,
  a hydraulic actuator that changes a relative rotational phase between the first rotor and the second rotor; and
  a lock mechanism that is configured to lock the relative rotational phase at an intermediate position located between a full retard position and a full advance position such that the relative rotational phase is unchanged, wherein the valve timing adjusting unit adjusts the valve timing by controlling the hydraulic actuator to perform a phase control for controlling the relative rotational phase, the valve timing control apparatus comprising:
  reference position learning means for learning, as a reference position, one of:
    (a) a first position of the relative rotational phase that is controlled through the phase control at control at the full retard position; and
    (b) a second position of the relative rotation phase that is locked by the lock mechanism at the intermediate position;
  actual phase computing means for computing an actual phase based on the learned reference position;
  target phase computing means for computing a target phase based on an operational state of the engine;
  feed-back controlling means for controlling the hydraulic actuator to perform the phase control based on a difference between the target phase and the actual phase; and
  abnormality determining means for determining whether the lock mechanism is under an abnormal state, wherein:
  when the abnormality determining means determines that the lock mechanism is under the abnormal state, the feed-back controlling means is prohibited from performing the phase control that uses the reference position, the lock mechanism includes:
- a lock pin that is provided of the second rotor, the lock pin being displaced from a retraction position, at which the lock pin is retracted within the second rotor, to a projection position, at which the lock pin projects from the second rotor, when a lock pin projection condition is satisfied, the lock pin being displace to the retraction position when a lock pin retration condition is satisfied; and
- a lock hole is formed at the first rotor, the lock hole being engageable with the lock pin that is located at the projection position in order to lock the relative rotational phase such that the relative rotational phase of the first rotor and the second rotor is unchanged; and
- a guide groove that is formed to the first rotor, the guide groove limiting a displacement range of the lock pin that is located at the projection position such that the guide groove guides the lock pin to the lock hole while the relative rotational phase is displaceable within a predetermined first limitation range, wherein:

the abnormality determining means determines that the lock mechanism is under the abnormal state when the phase difference falls beyond a predetermined phase difference range position while the lock pin retraction condition is satisfied;

the first position serves as the reference position; and the feed-back controlling means is allowed to perform the phase control using the reference position when the relative rotational phase has been shifted from the intermediate position while the lock pin projection condition is satisfied.

\* \* \* \* \*